United States Patent
Amaike

(10) Patent No.: US 10,676,078 B2
(45) Date of Patent: Jun. 9, 2020

(54) VEHICLE CONTROL SYSTEM, VEHICLE CONTROL METHOD, AND STORAGE MEDIUM

(71) Applicant: HONDA MOTOR CO., LTD., Minato-ku, Tokyo (JP)

(72) Inventor: Hiroshi Amaike, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 32 days.

(21) Appl. No.: 16/207,310

(22) Filed: Dec. 3, 2018

(65) Prior Publication Data

US 2019/0168740 A1 Jun. 6, 2019

(30) Foreign Application Priority Data

Dec. 5, 2017 (JP) .................. 2017-233612

(51) Int. Cl.
| | |
|---|---|
| *B60L 9/00* | (2019.01) |
| *B60W 20/13* | (2016.01) |
| *B60W 10/06* | (2006.01) |
| *B60W 10/08* | (2006.01) |
| *H02J 7/14* | (2006.01) |
| *B60W 20/00* | (2016.01) |
| *B60K 6/46* | (2007.10) |

(52) U.S. Cl.
CPC .......... *B60W 20/13* (2016.01); *B60W 10/06* (2013.01); *B60W 10/08* (2013.01); *B60W 20/00* (2013.01); *H02J 7/14* (2013.01); *B60K 6/46* (2013.01); *B60W 2510/244* (2013.01); *B60W 2540/22* (2013.01); *B60W 2710/06* (2013.01); *B60Y 2200/92* (2013.01)

(58) Field of Classification Search
CPC ....... B60W 20/13; B60W 10/06; B60W 10/08
See application file for complete search history.

(56) References Cited

U.S. PATENT DOCUMENTS

| | | | |
|---|---|---|---|
| 2013/0204493 A1* | 8/2013 | Ricci | G06F 17/00 701/41 |
| 2015/0035440 A1* | 2/2015 | Spero | F21V 23/0464 315/153 |

FOREIGN PATENT DOCUMENTS

JP 5233713 7/2013

* cited by examiner

*Primary Examiner* — Adam M Alharbi
(74) *Attorney, Agent, or Firm* — Amin, Turocy & Watson, LLP

(57) ABSTRACT

A vehicle control system may include a power generator, a storage battery, a running electric motor, a determiner configured to determine an area toward which a vehicle occupant of the vehicle has a line of vision directed; a deriver configured to derive an index based on a frequency at which the vehicle occupant has the line of vision directed toward a specific area on the basis of a determination result; and a controller configured to operate the power generator in a case in which an amount of power of the storage battery is equal to or smaller than a threshold and operate the power generator regardless of the threshold of the amount of power of the storage battery in a case in which the index derived is equal to or higher than a predetermined degree.

10 Claims, 11 Drawing Sheets

| INDEX BASED ON FREQUENCY | ANXIETY LEVEL |
|---|---|
| 1 | LOW |
| 2 | INTERMEDIATE |
| 3 | HIGH |
| ⋮ | ⋮ |

124

FIG. 6
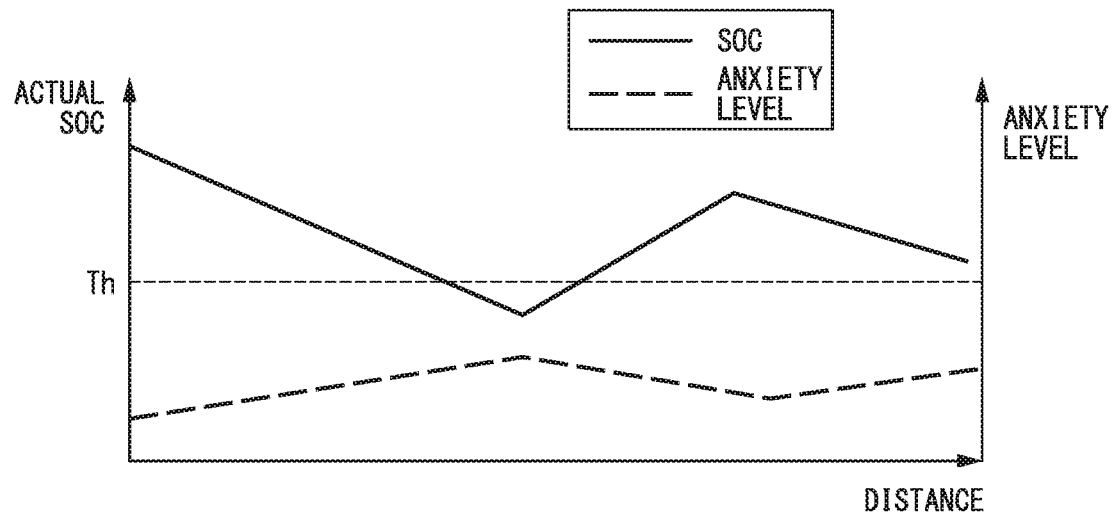
FIG. 7A
FIG. 7B
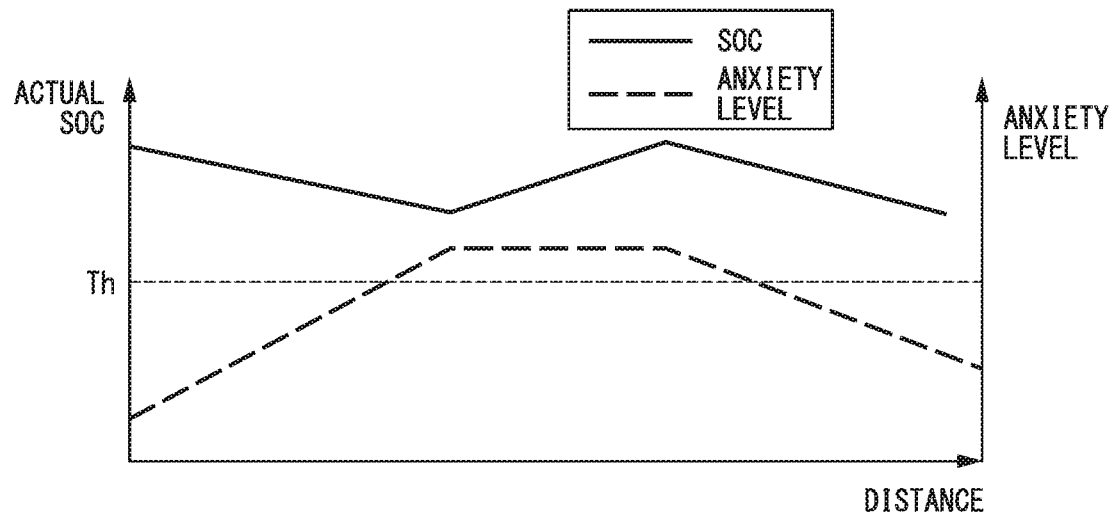

FIG. 9
| SOC \ ANXIETY FOR IN-SUFFICIENT POWER | ANXIETY | NO ANXIETY |
|---|---|---|
| HIGH (EXCEEDING SOC THRESHOLD) | NORMAL OUTPUT | |
| LOW (EQUAL TO OR LOWER THAN SOC THRESHOLD) | HIGH OUTPUT | NORMAL OUTPUT |
FIG. 10A
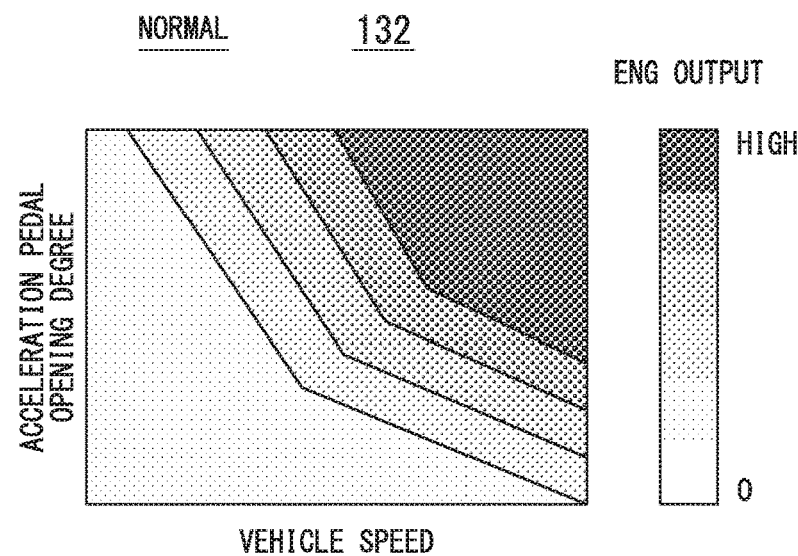
FIG. 10B
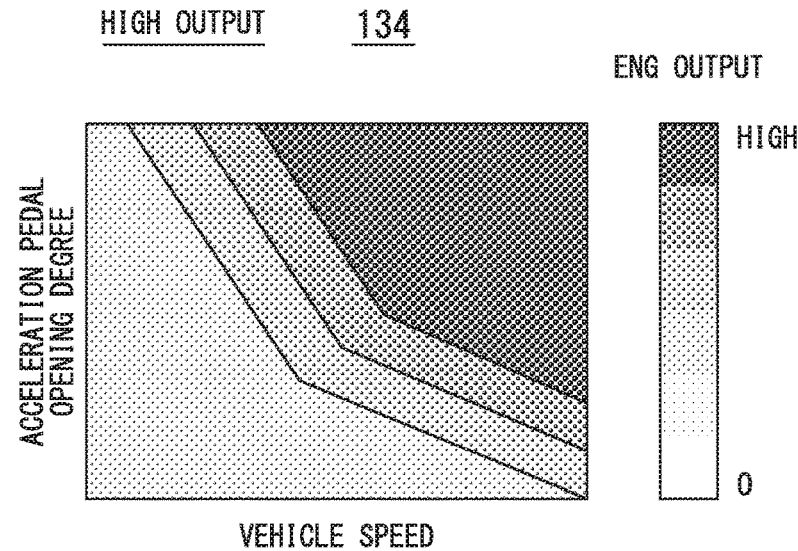

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2017-233612, filed on Dec. 5, 2017, the content of which is incorporated herein by reference.

BACKGROUND OF THE INVENTION

Field of the Invention

The present invention relates to a vehicle control system, a vehicle control method, and a storage medium.

Description of Related Art

Conventionally, vehicles are known which include electric motors driving driving wheels using electric power accumulated in a battery that is able to be charged using the electric power of a power generator and the electric power supplied from a charger. In relation to this, vehicles have been disclosed which set a target remaining capacity on the basis of a battery remaining capacity corresponding to the energy required for traveling from a current position to a charging base with a power set in advance, set a lower-limit remaining capacity for the target remaining capacity on the basis of power output characteristics representing a relationship between the output power of a battery required for vehicle running estimated on the basis of information relating to the details of actual running, a remaining capacity of the battery, and a power able to be output, perform control of a power generator such that the detected remaining capacity of the battery becomes the set target remaining capacity, and perform control for arriving at a charging base by efficiently using the battery power up to the target remaining capacity set in advance (for example, Japanese Patent No. 5233713).

However, similar to the vehicles described above, there are cases in which a timing at which a power generator is operated is not considered. For this reason, there are cases in which the power generator is not operated at a timing intended by a user.

An aspect of the present invention is in consideration of such situations, and one object thereof is to provide a vehicle control system, a vehicle control method, and a storage medium capable of operating a power generator at a timing intended by a user.

SUMMARY OF THE INVENTION

A vehicle control system, a vehicle control method, and a storage medium according to the present invention employ the following configurations.

(1): A vehicle control system according to one aspect of the present invention is a vehicle control system including: a power generator configured to include an internal combustion engine is configured to output power used by an electric motor and an electric motor is configured to generate power using power output by the internal combustion engine; a storage battery configured to store power generated by the power generator; a running electric motor configured to be connected to driving wheels of a vehicle and rotate the driving wheels by being driven using power supplied from the power generator or the storage battery; a determiner configured to determine an area toward which a vehicle occupant of the vehicle has a line of vision directed; a deriver configured to derive an index based on a frequency at which the vehicle occupant has a line of vision directed toward a specific area on the basis of a determination result acquired by the determiner; and a controller configured to operate the power generator in a case in which an amount of power of the storage battery is equal to or smaller than a threshold and operate the power generator regardless of the threshold of the amount of power of the storage battery in a case in which the index derived by the deriver is equal to or higher than a predetermined degree.

(2): In the aspect (1) described above, the specific area is an area in which an indicator indicating an amount of power stored in the storage battery is disposed.

(3): In the aspect (1) described above, the controller is configured to operate the power generator with a first output in a case in which the amount of power of the storage battery is equal to or smaller than the threshold and is configured to operate the power generator with the first output regardless of the threshold of the amount of power of the storage battery in a case in which the index derived by the deriver is equal to or higher than a predetermined degree, and the amount of power stored in the storage battery exceeds the threshold.

(4): In any one of the aspects (1) described above, the controller is configured to operate the power generator with a second output in a case in which the index derived by the deriver is lower than the predetermined degree, and the amount of power of the storage battery is equal to or smaller than the threshold and is configured to operate the power generator with a third output larger than the second output regardless of the threshold of the amount of power of the storage battery in a case in which the index derived by the deriver is equal to or higher than the predetermined degree, and the amount of power stored in the storage battery is equal to or smaller than the threshold.

(5): In any one of the aspects (1) described above, a running planner configured to generate running plan information representing a running plan to a destination of the vehicle, an operation planner configured to generate operation plan information that is an operation plan for operating the power generator on the basis of the running plan information generated by the running planner, and a monitor configured to monitor whether or not a current amount of power is lower than a target amount of power by a predetermined amount of power or more by comparing the current amount of power stored in the storage battery with the target amount of power of the storage battery associated with the operation plan information planned by the operation planner are further included, and the controller is configured to operate the power generator on the basis of a monitoring result acquired by the monitor and the operation plan information planned by the operation planner.

(6): In the aspect (5) described above, the controller temporarily cancels control of operating the power generator regardless of the threshold of the amount of power of the storage battery in a case in which the index derived by the deriver is equal to or higher than the predetermined degree, and it is determined by the monitor that the current amount of power is not smaller than the target amount of power by a predetermined amount of power or more.

(7): In the aspect (5) described above, an output controller configured to cause an outputter to output information indicating that the amount of power stored in the storage battery is within a range of a plan planned in advance in a case in which the index derived by the deriver is equal to or higher than the predetermined degree, and it is determined by the monitor that the current amount of power is not smaller than the target amount of power by a predetermined amount of power or more is further included.

(8): In any one of the aspects (1) described above, the index is an index representing an anxiety level of the vehicle occupant regarding the amount of power stored in the storage battery.

(9): Another aspect of the vehicle control system according to the present invention is a vehicle control method using an in-vehicle computer of a vehicle that comprises: (a) a power generator configured to include an internal combustion engine is configured to output power used by an electric motor and an electric motor is configured to generate power using power output by the internal combustion engine; (b) a storage battery configured to store power generated by the power generator; and (c) a running electric motor configured to be connected to driving wheels of a vehicle and rotate the driving wheels by being driven using power supplied from the power generator or the storage battery, the method comprising: determining an area toward which a vehicle occupant of the vehicle has a line of vision directed; deriving an index based on a frequency at which the vehicle occupant has the line of vision directed toward a specific area on the basis of a result of the determination; and operating the power generator in a case in which an amount of power of the storage battery is equal to or smaller than a threshold and operating the power generator regardless of the threshold of the amount of power of the storage battery storing power generated by the power generator in a case in which the derived index is equal to or higher than a predetermined degree.

(10): Another aspect of the vehicle control system according to the present invention is a non-transitory computer-readable storage medium that stores a computer program to be executed by a computer of a vehicle that comprises (a) a power generator configured to include an internal combustion engine is configured to output power used by an electric motor and an electric motor is configured to generate power using power output by the internal combustion engine; (b) a storage battery configured to store power generated by the power generator; and (c) a running electric motor configured to be connected to driving wheels of a vehicle and rotate the driving wheels by being driven using power supplied from the power generator or the storage battery, the medium to perform at least: determine an area toward which a vehicle occupant of the vehicle has a line of vision directed; derive an index based on a frequency at which the vehicle occupant has the line of vision directed toward a specific area on the basis of a result of the determination; and operate the power generator in a case in which an amount of power of the storage battery is equal to or smaller than a threshold and operating the power generator regardless of the threshold of the amount of power of the storage battery storing power generated by the power generator in a case in which the derived index is equal to or higher than a predetermined degree.

According to the aspects (1) to (10) described above, the power generator can be operated at a timing intended by a user. Accordingly, for example, even in a case in which the user has an anxiety regarding the amount of power stored in the battery, the user's anxiety can be alleviated.

According to the aspect (4) described above, the power generator is operated with a third output larger than the second output regardless of the threshold of the amount of power of the storage battery in a case in which the index derived by the deriver is equal to or higher than the predetermined degree, and the amount of power stored in the storage battery is equal to or smaller than the threshold, and accordingly, the user's anxiety can be further alleviated.

According to the aspect (6) described above, control of operating the power generator is temporarily cancelled regardless of the threshold of the amount of power of the storage battery in a case in which the index derived by the deriver is equal to or higher than the predetermined degree, and it is determined by the monitor that the current amount of power is not smaller than the target amount of power by a predetermined amount of power or more, and accordingly, a useless operation of the power generator can be curtailed.

According to the aspect (7) described above, an outputter is caused to output information indicating that the amount of power stored in the storage battery is within a range of a plan planned in advance in a case in which the index derived by the deriver is equal to or higher than the predetermined degree, and it is determined by the monitor that the current amount of power is not smaller than the target amount of power by a predetermined amount of power or more, and accordingly, the user's anxiety can be further alleviated.

BRIEF DESCRIPTION OF THE DRAWINGS

FIG. 6 is a diagram showing one example of a relation between a state in which a power generator is operated and a state in which the power generator is not operated;

FIG. 7A is a diagram showing one example of transitions in an anxiety level and transitions in an actual SOC according to the control of this embodiment;

FIG. 7B is a diagram showing one example of transitions in an anxiety level and transitions in an actual SOC according to the control of this embodiment;

FIG. 9 is a diagram showing one example of a relation between a case in which the power generator is operated with a normal output and a case in which the power generator is operated with a high output;

FIG. 10A is a diagram showing one example of details of a normal output map 132 stored in a storage 120;

FIG. 10B is a diagram showing one example of details of a high output map 134 stored in the storage 120;

DETAILED DESCRIPTION

Hereinafter, a vehicle control system, a vehicle control method, and a storage medium according to embodiments of the present invention will be described with reference to the drawings.

First Embodiment

[Entire Configuration]

Figure 1:
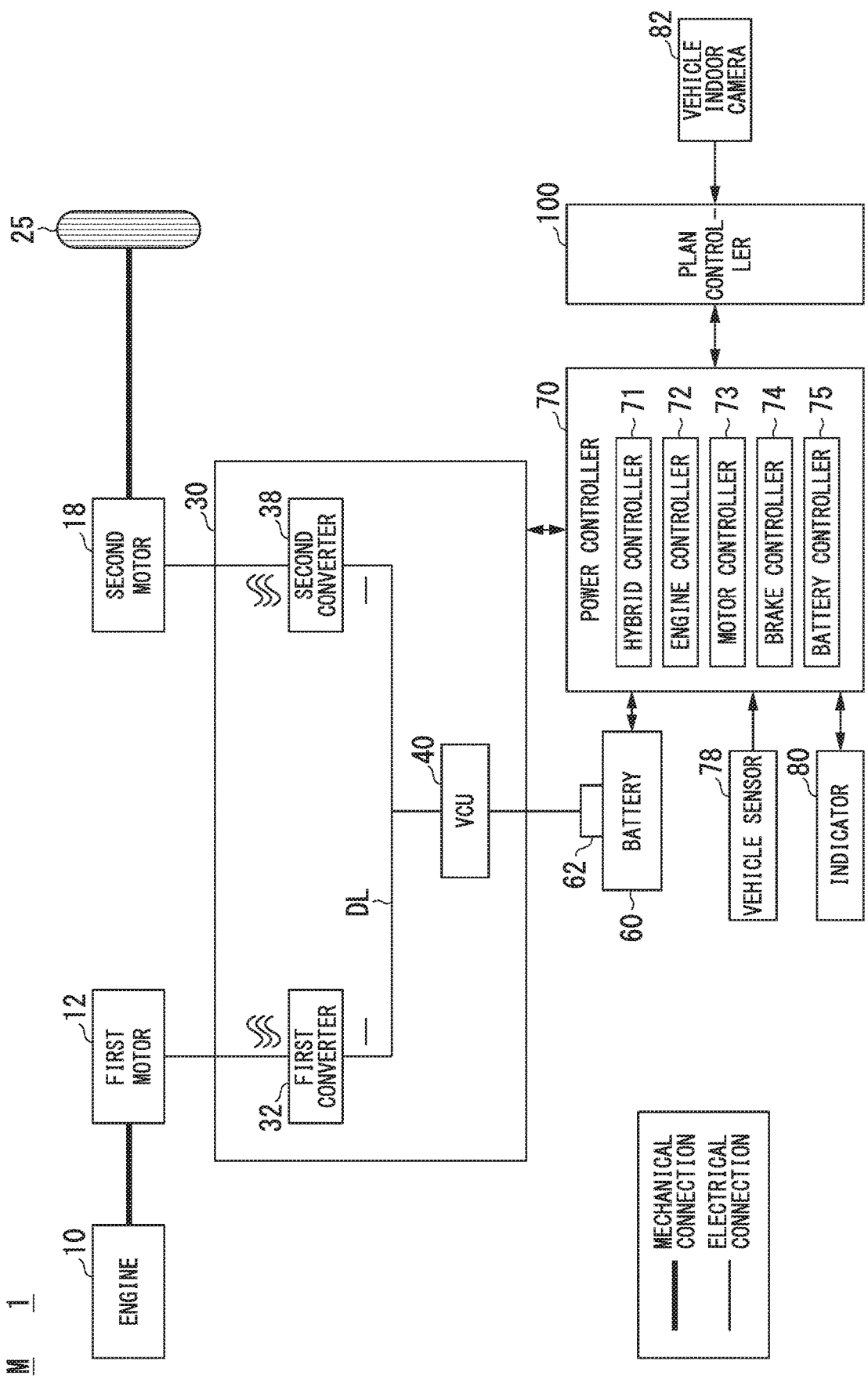
FIG. 1 is a diagram showing one example of the configuration of a vehicle in which a vehicle system including a vehicle control system is mounted.

FIG. 1 is a diagram showing one example of the configuration of a vehicle in which a vehicle system 1 including a vehicle control system is mounted (hereinafter, referred to as a subject vehicle M). A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. In a case in which an electric motor is included, the electric motor operates using electric power generated using a power generator connected to an internal combustion engine or discharge power of a secondary cell or a fuel cell. In the following description, a hybrid vehicle employing a series system will be described as an example. The series system is a system in which an engine and driving wheels are not mechanically connected, the power of the engine is used for power generation using a power generator, and generated electric power is supplied to an electric motor for driving. The subject vehicle M may be a vehicle capable of charging a plug-in battery.

As shown in FIG. 1, in the subject vehicle M, for example, an engine 10, a first motor (an electric motor) 12, a second motor (an electric motor) 18, driving wheels 25, a power controller (PCU) 30, a battery 60, a power controller 70, vehicle sensors 78, an indicator 80, a vehicle interior camera 82, and a plan controller 100 are mounted.

The engine 10 is an internal combustion engine that outputs power by combusting fuel such as gasoline. The engine 10, for example, may be a reciprocating engine including a cylinder and a piston, an intake valve, an exhaust valve, a fuel injection device, an injection plug, a connecting rod, a crank shaft, and the like. The engine 10 may be a rotary engine. The power that is outputable by the engine 10 is a power that is less than a power required for the first motor 12 to generate an amount of electric power used for driving the second motor 18 in real time (or an amount of electric power allowing the subject vehicle M to run at a predetermined speed or more). The engine has a small size and a low weight and thus has an advantage of having a high degree of freedom in an in-vehicle layout.

The first motor 12 is mainly used for power generation. The first motor 12, for example, is a three-phase AC electric motor. The first motor 12 has a rotor connected to an output shaft (for example, a crank shaft) of the engine 10 and generates power using the power output by the engine 10. Hereinafter, a combination of the engine 10 and the first motor 12 may be referred to as a "power generator".

The second motor 18 executes driving of the vehicle and regeneration. The second motor 18, for example, is a three-phase AC electric motor. A rotor of the second motor 18 is connected to the driving wheels 25. The second motor 18 outputs power to the driving wheels 25 using supplied electric power. The second motor 18 generates electric power using kinetic energy of the vehicle when the vehicle decelerates. Hereinafter, a power generating operation using the second motor 18 may be referred to as regeneration.

The PCU 30, for example, includes a first converter 32, a second converter 38, and a voltage control unit (VCU) 40. The configuration in which such constituent elements are grouped as the PCU 30 is merely one example, and such constituent elements may be disposed in a distributed manner.

The first converter 32 and the second converter 38, for example, are AC-to-DC converters. DC-side terminals of the first converter 32 and the second converter 38 are connected to a DC link DL. A battery 60 is connected to the DC link DL through a VCU 40. The first converter 32 converts an AC generated by the first motor 12 into a DC and outputs the DC to the DC link DL or converts a DC supplied through the DC link DL into an AC and supplies the AC to the first motor 12. Similarly, the second converter 38 converts an AC generated by the second motor 18 into a DC and outputs the DC to the DC link DL or converts a DC supplied through the DC link DL into an AC and supplies the AC to the second motor 18.

The VCU 40, for example, is a DC-to-DC converter. The VCU 40 boosts the electric power supplied from the battery 60 and outputs the boosted electric power to the DC link DL.

The battery 60, for example, is a secondary battery such as a lithium ion battery. The power controller 70, for example, includes a hybrid controller 71, an engine controller 72, a motor controller 73, a brake controller 74, and a battery controller 75. The hybrid controller 71 outputs instructions to the engine controller 72, the motor controller 73, the brake controller 74, and the battery controller 75. An instruction using the hybrid controller 71 will be described later.

The engine controller 72 performs ignition control of the engine 10, throttle opening degree control, fuel injection control, fuel cutting control, and the like in accordance with instructions from the hybrid controller 71. The engine controller 72 may calculate an engine speed on the basis of an output of a crank angle sensor mounted in the crank shaft and output the engine speed to the hybrid controller 71.

The motor controller 73 performs switching control of the first converter 32 and/or the second converter 38 in accordance with an instruction from the hybrid controller 71.

The brake controller 74 controls a brake device not shown in the drawing in accordance with an instruction from the hybrid controller 71. The brake device is a device that outputs a brake torque corresponding to a driver's braking operation to each vehicle wheel.

The battery controller 75 calculates an amount of electric power (for example, a state of charge (SOC); charging ratio) of the battery 60 on the basis of an output of a battery sensor 62 mounted in the battery 60 and outputs the amount of electric power to the hybrid controller 71.

The vehicle sensors 78, for example include an accelerator opening degree sensor, a vehicle speed sensor, a brake depression amount sensor, and the like. The accelerator opening degree sensor is mounted in an acceleration pedal, detects an amount of operation on the acceleration pedal, and outputs an accelerator opening degree derived on the basis of results of the detection to the power controller 70. The acceleration pedal is one example of an operator that accepts an acceleration instruction from a driver. The vehicle sensor, for example, includes a vehicle wheel speed sensor mounted in each vehicle wheel and a speed calculator, derives a speed of the vehicle (vehicle speed) by integrating vehicle wheel speeds detected by vehicle wheel speed sensors, and outputs the derived results to the power controller 70. The brake depression amount sensor is mounted in a brake pedal, detects an amount of operation on the brake pedal, and outputs an amount of brake depression derived on the basis of the detection results to the power controller 70. The brake pedal is one example of an operator that accepts a deceleration or stop instruction from a driver.

Here, control using the hybrid controller 71 will be described. The hybrid controller 71, first, derives a driving shaft required torque Td on the basis of the degree of accelerator opening and a target vehicle speed and determines a driving shaft required power Pd output by the second motor 18 on the basis of the derived result. The hybrid controller 71 determines whether to operate the engine 10 or not on the basis of the determined driving shaft required power Pd, a power consumption of auxiliary machines, the amount of electric power of the battery 60, and the like. Then, in a case in which it is determined that the engine 10 will be operated, the hybrid controller 71 determines an engine power Pe to be output by the engine 10.

The hybrid controller 71 determines a reaction torque of the first motor 12 in accordance with the determined engine power Pe such that it balances with the engine power Pe. The hybrid controller 71 outputs determined information to the engine controller 72. In a case in which the brake is operated by a driver, the hybrid controller 71 determines a distribution between a brake torque that can be output through regeneration of the second motor 18 and a brake torque to be output by the brake device and outputs a result of the determination to the motor controller 73 and the brake controller 74.

The indicator 80 is a measuring instrument that indicates an SOC of the battery 60 on the basis of the control of the power controller 70. The indicator 80, for example, may be disposed in an instrument panel. For example the indicator 80 disposed near meters indicating a speed and the like of the vehicle.

The vehicle interior camera 82, for example, is a digital camera using a solid state imaging device such as a charge coupled device (CCD) or a complementary metal oxide semiconductor (CMOS). The vehicle interior camera 82, for example, executes imaging focusing on an upper half body of a vehicle occupant sitting on a driver seat (or any other indoor vehicle occupant). A captured image acquired by the vehicle interior camera 82 is output to the plan controller 100.

The vehicle system 1 further includes a navigation device, a communicator, and the like not shown in the drawings in addition to the components described above. The navigation device, for example, includes a global navigation satellite system (GNSS) receiver, a navigation HMI, and a route determiner and stores map information in a storage device such as a hard disk drive (HDD) or a flash memory. The GNSS receiver identifies a position of the subject vehicle M on the basis of signals received from GNSS satellites. The navigation HMI includes a display device, a speaker, a touch panel, a key, and the like. The route determiner, for example, determines a route (hereinafter, referred to as a route on the map) from a position of the subject vehicle M identified by the GNSS receiver (or an input arbitrary position) to a destination by referring to first map information. The destination, for example, is a destination that is input by a user using the navigation HMI. The map information, for example, is information that represents road shapes using links representing roads and nodes connected using links. The navigation device, for example, may be implemented by a function of a terminal device such as a smartphone or a tablet terminal held by a user.

The communicator communicates with other vehicles present in the vicinity of the subject vehicle M, for example, using a cellular network, a Wi-Fi network, Bluetooth (registered trademark), dedicated short range communication (DSRC), or the like or communicates with various server apparatuses through a radio base station.

[Plan Controller]

Figure 2:
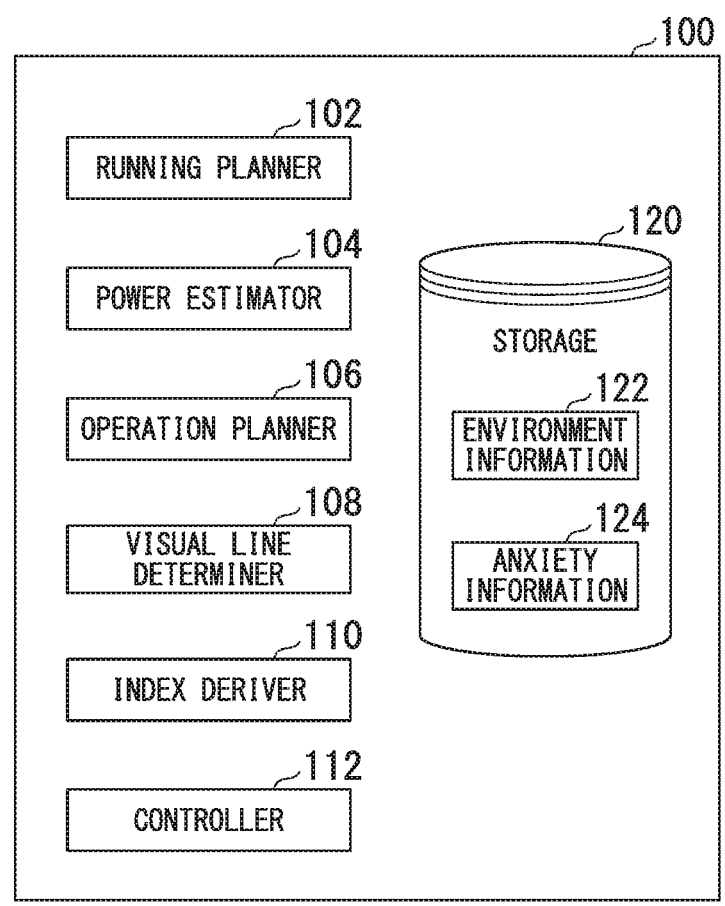
FIG. 2 is a diagram showing one example of the functional configuration of a plan controller.

FIG. 2 is a diagram showing one example of the functional configuration of the plan controller 100. The plan controller 100, for example, includes a running planner 102, a power estimator 104, an operation planner 106, a line of vision determiner 108, an index deriver 110, and a controller 112. The running planner 102, the power estimator 104, the operation planner 106, the line of vision determiner 108, the index deriver 110, and the controller 112, for example, are implemented by a hardware processor such as a central processing unit (CPU) executing a program (software). Some or all of such constituent elements may be implemented by hardware (a circuit; including circuitry) such as a large scale integration (LSI), an application specific integrated circuit (ASIC), a field-programmable gate array (FPGA), or a graphics processing unit (GPU) or may be implemented by cooperation between software and hardware. A program may be stored in a storage device such as a hard disk drive (HDD) or a flash memory in advance, or a program may be stored in a storage medium such as a DVD or a CD-ROM that can be loaded or unloaded and be installed in a storage device by loading the storage medium into a drive device.

The storage 120, for example, is implemented by a nonvolatile storage device such as a read only memory (ROM), an electrically erasable and programmable read only memory (EEPROM), or a hard disk drive (HDD) and a volatile storage device such as a random access memory (RAM) or a register. In the storage 120, for example, environment information 122 and anxiety level information 124 are stored. Details of the information will be described later.

[Running Planner]

The running planner 102 generates running plan information representing a running plan to a destination of the vehicle. The destination of the vehicle, for example, is a destination that is set by a vehicle occupant operating a navigation device not shown in the drawing. The running plan is a plan in which a time at which a user desires to arrive at a destination, traffic congestion information of roads, a route over which a user desires to pass, a type of road on which a user desires to pass, and the like are taken into account. The running plan includes a speed of the vehicle in each section that is derived and predicted on the basis of the information described above.

The running planner 102 generates running plan information, for example, on the basis of the environment information 122. The environment information 122 is information relating to roads on which the vehicle is planned to run. In the environment information 122, information such as weather, a degree of congestion, speed limits, and the like of roads on which the vehicle is planned to run is stored. This information may be information that is transmitted by a server apparatus and is acquired by the communicator or information generated by the running planner 102 on the basis of information acquired using the communicator.

The running plan, for example, is displayed on a display of the navigation device, and a vehicle occupant controls the vehicle in accordance with the running plan displayed on the display. A vehicle according to this embodiment may be an automated driving vehicle that automated controls steering and acceleration/deceleration of the vehicle on the basis of the running plan and the surrounding situations of the vehicle.

[Power Estimator]

The power estimator 104 derives a required amount of power that is necessary for moving from a point of departure to a destination in the running plan generated by the running planner 102. For example, the required amount of power may be an amount acquired by summing an amount of running power predicted to be consumed in accordance with driving of the second motor 18 in the case of running according to the running plan, an amount of in-vehicle power predicted to be consumed by in-vehicle devices and the like other than the second motor 18, and an SOC set to be left in the battery 60 when the vehicle arrives at the destination. For example, in a case in which a charging facility is present at the destination, the power estimator 104 may determine the SOC at the time of arrival at the destination as zero to several ten percent.

The power estimator 104 derives an amount of power generation to be generated by the power generator in the required amount of power generation. The amount of power generation is an amount of power that is insufficient in a case in which the SOC of the battery 60 at the time of departure (or at present) is subtracted from the required amount of power.

[Operation Planner]

The operation planner 106 generates operation plan information that is an operation plan for operating the power generator on the basis of the running plan information generated by the running planner 102. The operation plan includes a timing at which the power generator is operated, an operation period, an output of the power generator, an amount of power per unit time that is generated by the power generator, and the like. When the power generator is operated in accordance with the operation plan, the power corresponding to the amount of power generation is generated in the route to the destination. The operation planner 106 generates an operation plan for generating power using the power generator such that the SOC of the battery 60 becomes not equal to or smaller than a threshold (hereinafter, referred to as an SOC threshold).

[Line of Vision Determiner]

The line of vision determiner 108 performs a line of vision determining process as below. The line of vision determiner 108 analyzes an image captured by the vehicle interior camera 82. The line of vision determiner 108 determines an area toward which a driver (or a vehicle occupant) has a line of vision directed on the basis of a result of the analysis. For example, the line of vision determiner 108 may determine whether or not the driver has a line of vision directed toward a specific area on the basis of a result of the analysis. The specific area, for example, may be an area including the indicator 80.

Figures 3, 4:
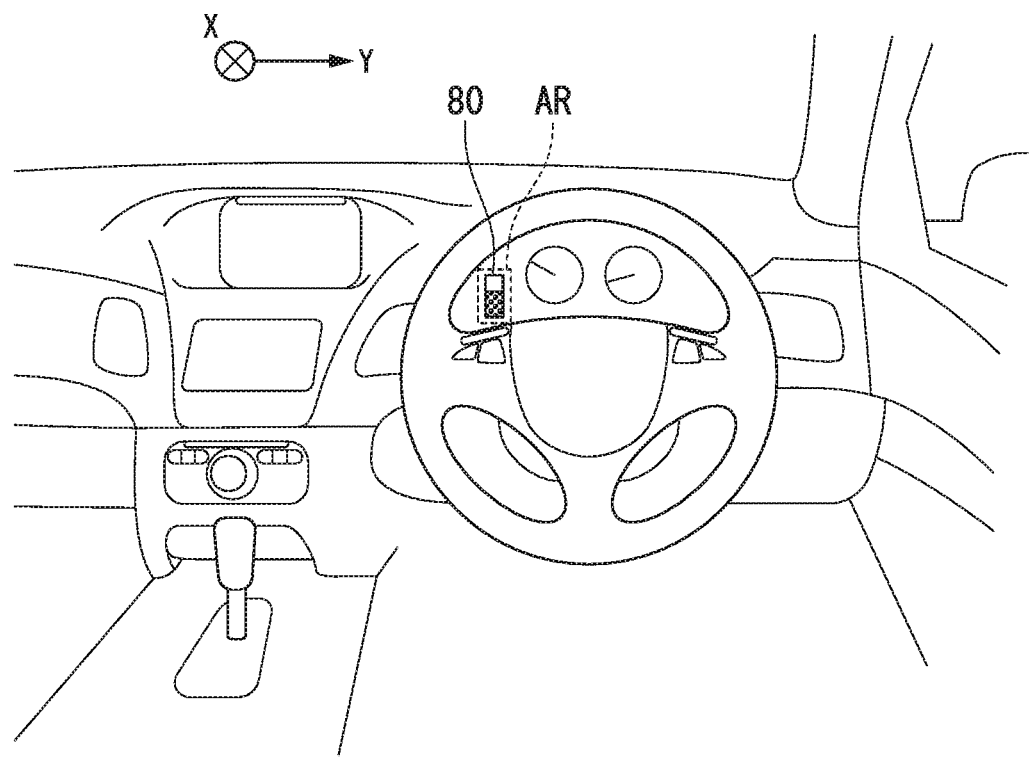
FIG. 3 is a diagram showing one example of a specific area.
FIG. 4 is a diagram showing one example of details of anxiety level information.

FIG. 3 is a diagram showing one example of a specific area. Hereinafter, description will be presented using XY coordinates as necessary. For example, a direction X is a direction of the center axis of the subject vehicle M, and a direction Y is a widthwise direction of the subject vehicle M. In the drawing, a specific area AR is one example of a specific area including the indicator 80 inside the vehicle cabin.

For example, the line of vision determiner 108 may detect a positional relation between a head part and the eyes of the driver and a combination of a reference point and a moving point of the eyes in an image using a technique such as template matching or the like. Then, the line of vision determiner 108 derives a direction of the line of vision by performing a transformation process from an image plane to an actual plane and the like on the basis of the position of the eyes with respect to the head part and the position of the moving point with respect to the reference point. For example, in a case in which the reference point is an inner corner of the eye, the moving point is an iris. In a case in which the reference point is a corneal reflection area, the moving point is a pupil. The corneal reflection area is a reflection area of infrared light in the cornea when the vehicle interior camera 82 or the like emits infrared light toward a driver. In this way, the line of vision determiner 108 determines whether or not the derived direction of the line of vision is directed in the direction toward the specific area.

The line of vision determiner 108 may determine whether the line of vision of the driver is directed toward the specific area directly from an image on the basis of information stored in a storage device included in the plan controller 100. In the storage device described above, a relation between the direction of the head part of the driver, the position of the reference point, and the position of the moving point in an image and information indicating whether the line of vision is present inside the specific area in a case in which the relation is satisfied are stored in association with each other.

[Index Deriver]

The index deriver 110 derives an index based on a frequency at which a driver (or a vehicle occupant) has a line of vision directed toward the specific area. Here, the frequency is a degree at which the driver has a line of vision directed toward the specific area per unit time. The frequency becomes higher as the number of times at which the driver has a line of vision directed toward the specific area per unit time increases. The index based on a frequency may be the frequency at which the driver has a line of vision directed toward the specific area or a value derived by applying the frequency to a function or an algorithm prepared in advance.

For example, the index deriver 110 may derive an index by referring to the anxiety level information 124. FIG. 4 is a diagram showing one example of details of the anxiety level information 124. The anxiety level information 124 is information that associates the index based on the frequency at which the driver has the line of vision directed toward the specific area and the anxiety level for power insufficiency with each other.

[Controller]

The controller 112 operates the power generator or stops the operation of the power generator on the basis of the operation plan generated by the operation planner 106. The controller 112 operates the power generator in a case in which the amount of power of the battery 60 is equal to or lower than the SOC threshold. In addition, in a case in which the index derived by the index deriver 110 is equal to or greater than a predetermined degree, the controller 112 may operate the power generator regardless of the SOC threshold of the amount of power of the battery 60 (even in a case in which the amount of power of the battery 60 exceeds the SOC threshold).

[Flowchart]

Figure 5:
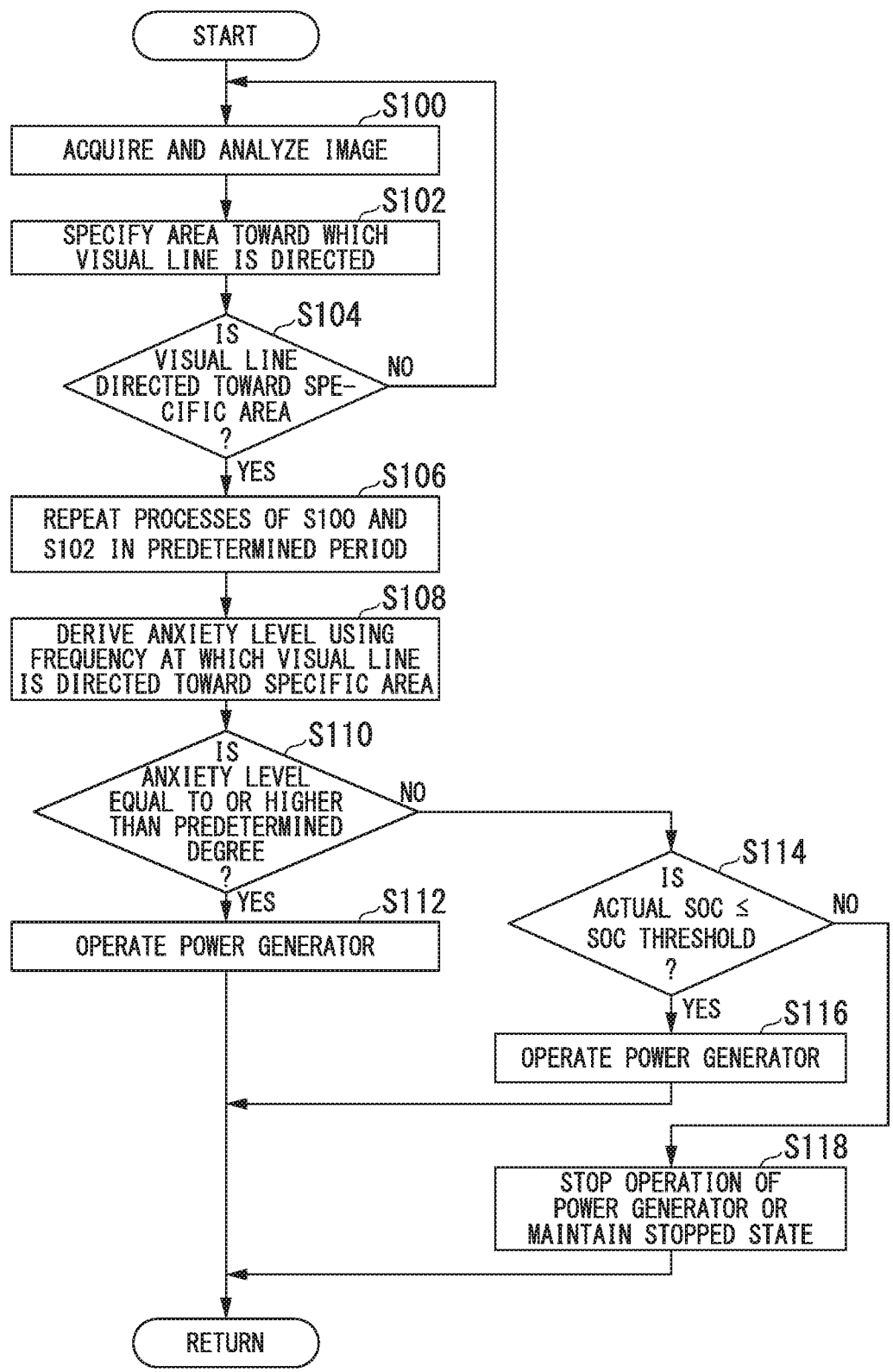
FIG. 5 is a flowchart showing one example of the flow of a process executed by a plan controller.

FIG. 5 is a flowchart showing one example of the flow of a process executed by the plan controller 100. First, the line of vision determiner 108 acquires an image captured by the vehicle interior camera 82 and analyzes the acquired image (Step S100). Next, the line of vision determiner 108 identifies an area toward which the driver has the line of vision directed on the basis of a result of the analysis of the image acquired in Step S100 (Step S102). Next, the line of vision determiner 108 determines whether or not the area identified in Step S102 is the specific area (Step S104).

In a case in which the area identified in Step S102 is the specific area, the line of vision determiner 108 repeats the processes of Steps S100 and S102 described above in a predetermined period (Step S106). Next, the index deriver 110 derives an anxiety level using the frequency at which the line of vision is directed toward the specific area on the basis of the result of the process acquired in Step S106 by referring to the anxiety level information 124 (Step S108).

Next, the index deriver 110 determines whether or not the anxiety level derived in Step S108 is equal to or higher than a predetermined degree (Step S110). In a case in which the anxiety level derived in Step S108 is equal to or higher than the predetermined degree, the controller 112 operates the power generator regardless of the SOC threshold (Step S112).

On the other hand, in a case in which the anxiety level derived in Step S108 is not equal to or higher than the predetermined degree, the controller 112 compares a current SOC (hereinafter, referred to as an actual SOC) with the SOC threshold and determines whether or not the actual SOC is equal to or lower than the SOC threshold (Step S114). In a case in which the actual SOC is equal to or lower than the SOC threshold, the controller 112 operates the power generator (Step S116).

On the other hand, in a case in which the actual SOC exceeds the SOC threshold, the controller 112 stops the operation of the power generator in a case in which the power generator is operating (for example, in a case in which the actual SOC is sufficiently larger than the SOC threshold) and maintains the stopped state of the power generator in a case in which the power generator is not operating (Step S118). In this way, the process of one routine of this flowchart ends.

In a case in which the anxiety level is equal to or higher than the predetermined degree, and the actual SOC is equal to or larger than a predetermined value (for example, 90%) in the process of Step S110, the controller 112 may not operate the power generator.

FIG. 6 is a diagram showing one example of a relation between a state in which the power generator is operated and a state in which the power generator is not operated. As described above, it is determined whether or not the power generator is operated on the basis of a relation between a state in which the actual SOC exceeds the SOC threshold or a state in which the actual SOC is equal to or lower than the SOC threshold and a state in which there is an anxiety of a driver (or a vehicle occupant) regarding insufficient power or a state in which there is no anxiety. For example, in a case in which the actual SOC exceeds the SOC threshold, and there is a state in which there is no anxiety regarding insufficient power, the power generator is not operated. On the other hand, in the other cases, the power generator is operated. In accordance with the process described above, the power generator can be operated at a timing intended by the user.

FIGS. 7A and 7B are diagrams showing one example of transitions in an anxiety level and transitions in an actual SOC according to the control of this embodiment. In FIGS. 7A and 7B, the vertical axis represents the actual SOC or the anxiety level, and the horizontal axis represents a distance from a point of departure to a destination of a vehicle. A threshold Th represents the SOC threshold or the threshold for the anxiety level. In a case in which the anxiety level exceeds the threshold Th, a state in which the driver's anxiety level is high is formed.

FIG. 7A is a diagram showing transitions in the actual SOC in a case in which the anxiety level does not exceed the threshold Th. FIG. 7B is a diagram showing transitions in the actual SOC in a case in which the anxiety level exceeds the threshold Th. In the case shown in FIG. 7A, since the anxiety level does not exceed the threshold Th, the power generator is operated in a case in which the actual SOC is equal to or smaller than the threshold Th. In the case shown in FIG. 7B, in a case in which the anxiety level exceeds the threshold Th, the power generator is operated even in a case in which the actual SOC exceeds the threshold Th. In this way, since the power generator is controlled in accordance with the anxiety level of a user, the power generator can be operated at a timing intended by the user.

In the first embodiment described above, in a case in which an index derived by the index deriver 110 is equal to or larger than a predetermined degree, the plan controller 100 operates the power generator regardless of the threshold of the amount of power of the battery 60, whereby the power generator can be operated at a timing intended by the user. In this way, since the power generator starts to generate power in a case in which a user has an anxiety regarding the amount of power of the battery 60, the user's anxiety can be alleviated.

Second Embodiment

Hereinafter, a second embodiment will be described. Although an output level of the power generator has not been described in the first embodiment, in the second embodiment, an output level of a power generator will be described. In the second embodiment, a plan controller 100 sets an output level of the power generator to be higher, for example, in a case in which the anxiety level is equal to or higher than a predetermined degree, and the actual SOC is equal to or lower than the SOC threshold than in the other cases. Hereinafter, items not described in the first embodiment will be focused on in the description.

A controller 112 determines an output level of the power generator when the power generator is operated in Steps S112 and S116 in the flowchart shown in FIG. 5 described above by performing a process of a flowchart shown in FIG. 8 to be described later. Here, the output level is a magnitude of the amount of power generated by the power generator, a degree of operation of the power generator, or the like.

[Flowchart]

Figure 8:
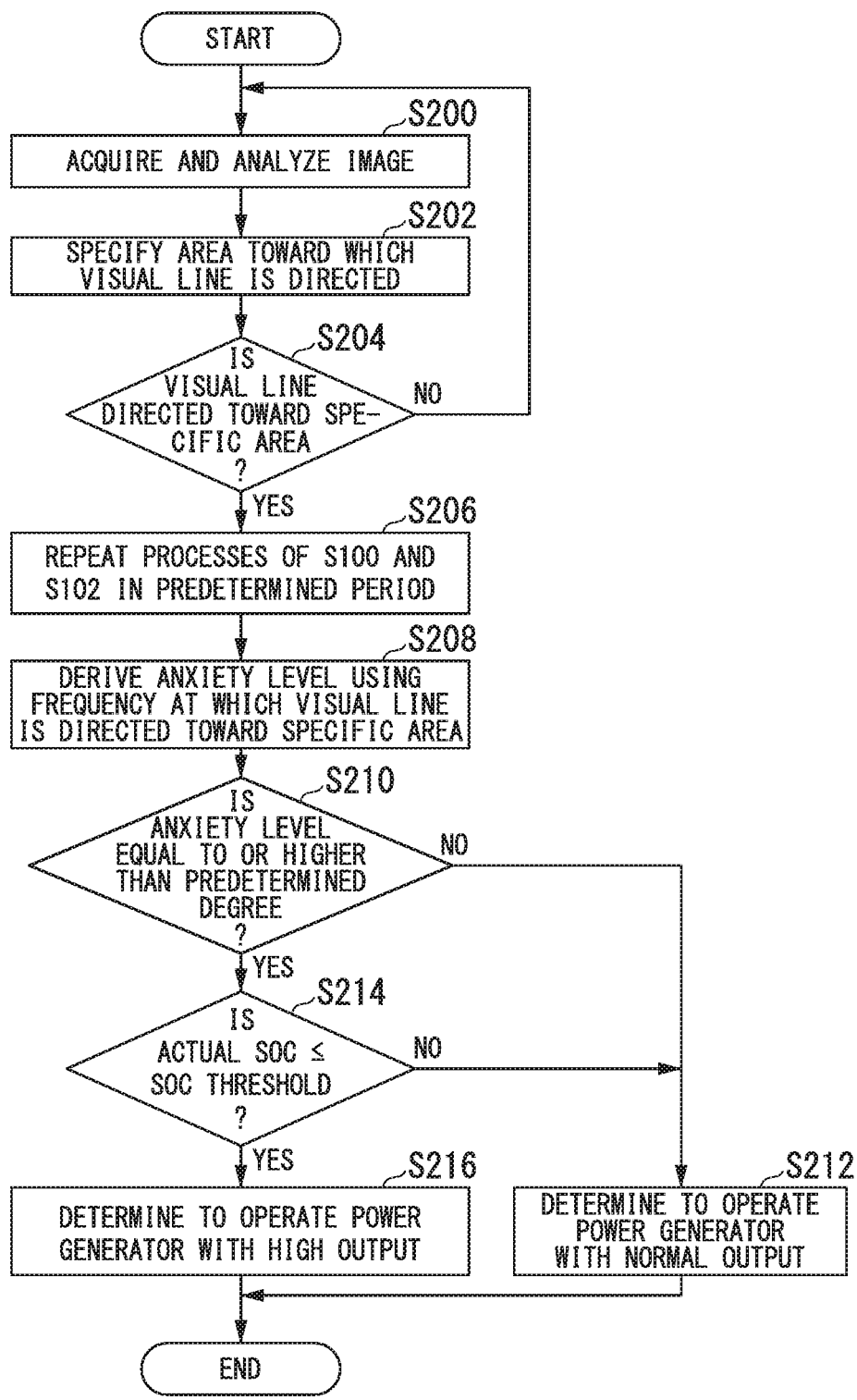
FIG. 8 is a flowchart showing the flow of a process executed by a plan controller according to a second embodiment.

FIG. 8 is a flowchart showing the flow of a process executed by the plan controller 100 according to the second embodiment. The processes of Steps S200 to S208 shown in FIG. 8 are similar to the processes of Steps S100 to S108 shown in FIG. 5, and thus description thereof will not be presented here. For the processes of Steps S200 to S208 shown in FIG. 8, the results of the processes of Steps S100 to S108 shown in FIG. 5 may be cited. In such a case, the processes of Steps S200 to S208 are omitted.

In Step S210, the index deriver 110 determines whether or not the anxiety level derived in Step S208 is equal to or higher than a predetermined degree (Step S210). In a case in which the anxiety level derived in Step S208 is not equal to or higher than the predetermined degree, the controller 112 determines to operate the power generator with a normal output (a second output) (Step S212).

On the other hand, in a case in which the anxiety level derived in Step S208 is not equal to or higher than the predetermined degree, the controller 112 compares an actual SOC with an SOC threshold and determines whether or not the actual SOC is equal to or lower than the SOC threshold (Step S214).

In a case in which the actual SOC exceeds the SOC threshold, the process proceeds to the process of Step S212. On the other hand, in a case in which the actual SOC is equal to or lower than the SOC threshold, the controller 112 determines to operate the power generator with an output (a third output) higher than the normal output (Step S216). In this way, the process of one routine of this flowchart ends. In accordance with the process described above, the output of the power generator in Step S112 or Step S116 of the flowchart shown in FIG. 5 is determined (see FIG. 9).

FIG. 9 is a diagram showing one example of a relation between a case in which the power generator is operated with a normal output and a case in which the power generator is operated with a high output. As described above, the output level of the power generator is determined on the basis of a relation between the state in which the actual SOC exceeds the SOC threshold or the state in which the actual SOC is equal to or lower than the SOC threshold and the state in which there is an anxiety of a driver (or a vehicle occupant) regarding insufficient power or the state in which there is not such an anxiety. For example, in a case in which the state in which there is an anxiety regarding insufficient power is formed, and the actual SOC is equal to or lower than the SOC threshold, the output level of the power generator is set to be high. On the other hand, in other cases, the power generator is set to a normal output level. Here, a state in which there is no anxiety regarding insufficient power, and the actual SOC is higher than the SOC threshold is not included in the other cases described above.

In accordance with the process described above, in the case of a state in which the actual SOC is equal to or lower than the SOC threshold, and the user's anxiety further increases, the output of the power generator further increases, and accordingly, the user's anxiety can be reliably alleviated.

[Output Map]

The controller 112, for example, determines an output level of the power generator on the basis of the output map 130. FIG. 10A is a diagram showing one example of details of a normal output map 132 stored in the storage 120. FIG. 10B is a diagram showing one example of details of a high output map 134 stored in the storage 120. In FIGS. 10A and 10B, the vertical axis represents the magnitude of an acceleration pedal opening degree, and the horizontal axis represents the magnitude of a vehicle speed. The output map 130 is information associating an acceleration pedal opening degree and a vehicle speed with an output level of the power generator. The output map 130 is set to have a trend such that an output level of the power generator becomes higher as the acceleration pedal opening degree increases, or the vehicle speed increases.

The output map 130 includes the normal output map 132 and the high output map 134. The normal output map 132 is a map that is used when it is determined that the power generator will be operated with a normal output. The high output map 134 is a map that is used when it is determined that the power generator will be operated with a high output. The high output map 134 is set to have a trend in which the output level of the power generator is higher than that of the normal output map 132 even in a case in which the conditions of the acceleration pedal opening degree and the vehicle speed are similar to the conditions of the normal output map 132.

In a case in which the anxiety level is equal to or higher than a predetermined degree, and the actual SOC is equal to or lower than the SOC threshold, the controller 112 performs control of the power generator such that the output level is higher than that of the other cases in accordance with the high output map 134, thereby relieving the user's anxiety.

According to the second embodiment described above, the plan controller 100 sets the output level of the power generator to be high in a case in which a state in which there is an anxiety regarding insufficient power is formed, and the actual SOC is equal to or lower than the SOC threshold and sets the output level of the power generator to a normal output level in other cases. Accordingly, the power generator can be controlled at a timing intended by the user as intended by the user. In other words, at a timing at which the user has an anxiety regarding the SOC of the battery 60 and desires to operate the power generator with a high output level, the power generator can be operated with an output level higher than the normal output level.

Third Embodiment

Hereinafter, a third embodiment will be described. According to the third embodiment, even when the anxiety level of the user is equal to or higher than a predetermined level, in a case in which the actual SOC is not lower than a target SOC by a predetermined amount of power or more, a plan controller does not operate the power generator and causes an outputter to output information indicating that the actual SOC is within a plan. Hereinafter, differences from the first embodiment will be focused on in the description.

Figure 11:
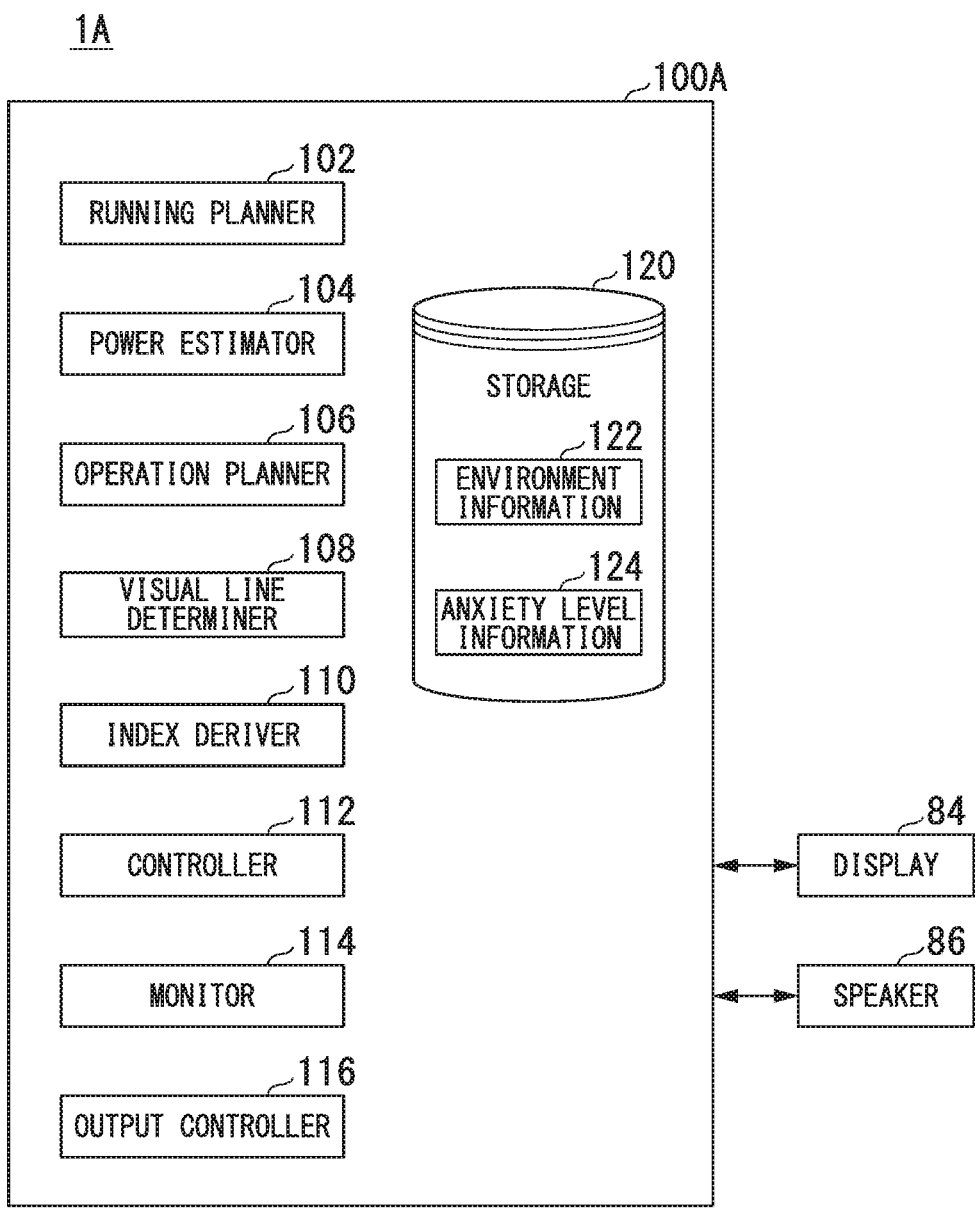
FIG. 11 is a diagram showing one example of the functional configuration of a vehicle system 1A focusing on a plan controller according to a third embodiment.

FIG. 11 is a diagram showing one example of the functional configuration of a vehicle system 1A focusing on the plan controller 100A according to the third embodiment. The vehicle system 1A, for example, includes a display 84 and a speaker 86 in addition to the functional configuration of the vehicle system 1 according to the first embodiment. The vehicle system 1A includes the plan controller 100A instead of the plan controller 100 of the vehicle system 1. In FIG. 11, in the vehicle system 1A, functional configurations other than the display 84, the speaker 86, and the plan controller 100A are omitted.

The display 84, for example, is a head up display (HUD) that allows the eyes of a vehicle occupant sitting on a driver seat to visually recognize a virtual image by projecting an image onto a part of a front windshield in front of the driver seat. The display 84, for example, may be a display device such as a liquid crystal display (LCD) or an organic electroluminescence (EL) display or may have a configuration in which a display device and a touch pad are combined. The display 84 is a device that outputs information to a vehicle occupant of the vehicle. The speaker 86 outputs speech in accordance with an instruction from the plan controller 100.

The plan controller 100A further includes a monitor 114 and an output controller 116 in addition to the functional configuration of the plan controller 100. The monitor 114 compares an actual SOC with a target SOC of a battery 60 and monitors whether the actual SOC is lower than the target SOC by a predetermined amount of power or more. Here, the target SOC of the battery 60 is an SOC that is associated with operation plan information planned by an operation planner 106. The target SOC (hereinafter, referred to as a target SOC), for example, is a target SOC set with respect to a position of the vehicle and a time in a case in which the vehicle is running along a route from a point of departure to a destination planned by the operation planner 106 in advance.

In a case in which the index derived by the index deriver 110 is equal to or higher than a predetermined degree, and it is determined by the monitor 114 that the actual SOC is not lower than the target SOC by a predetermined amount of power or more, the output controller 116 causes an outputter (the display 84 or the speaker) to output information indicating that the amount of power accumulated in the battery 60 is within a range of the plan made in advance.

In a case in which it is determined by the monitor 114 that the actual SOC is not lower than the target SOC by the predetermined amount or more, even in a case in which the index derived by the index deriver 110 is equal to or higher than a predetermined degree, the controller 112 temporarily cancels control of operating the power generator regardless of the threshold of the amount of power of the battery 60.

[Flowchart]

Figure 12:
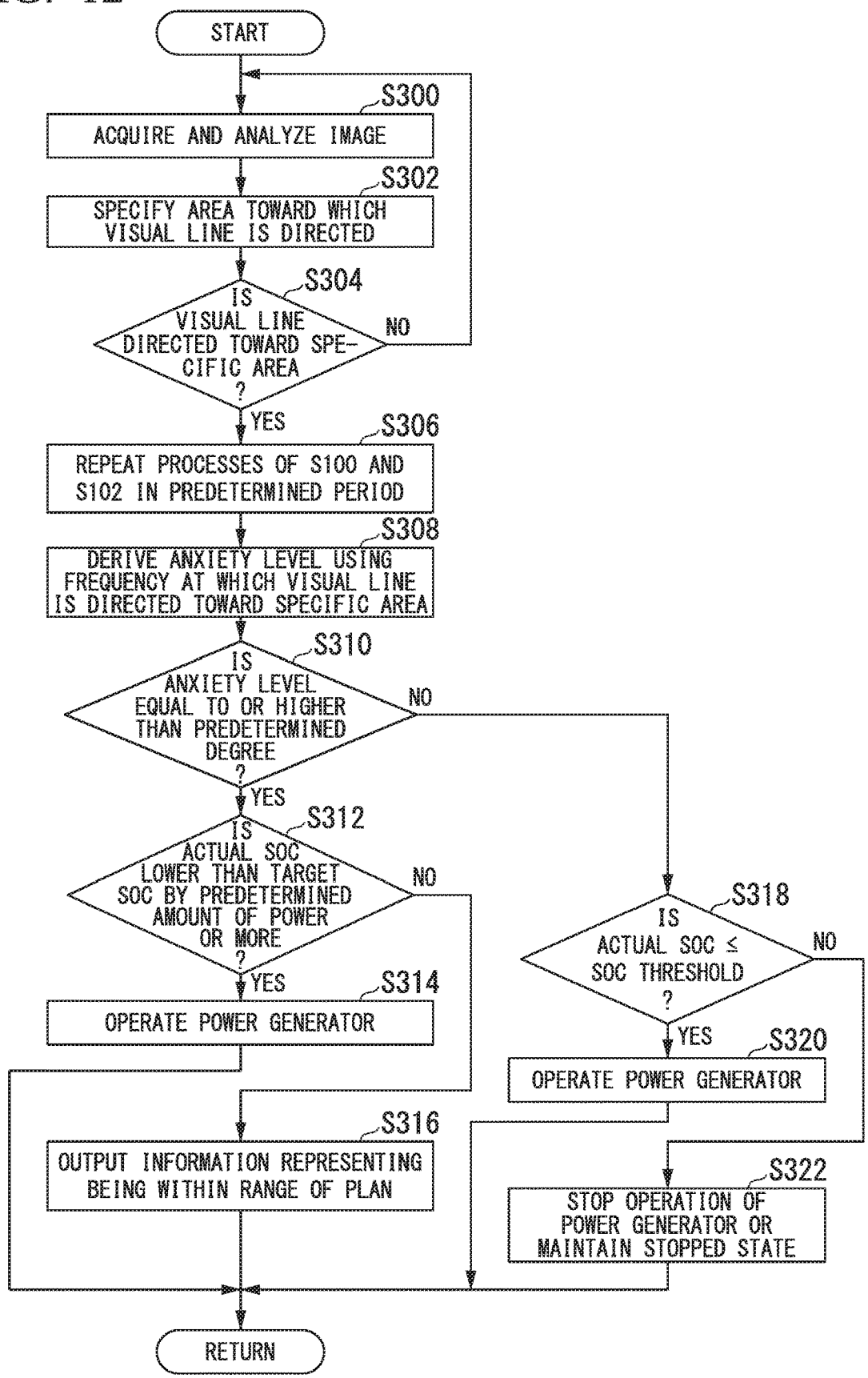
FIG. 12 is a flowchart showing one example of the flow of a process executed by the plan controller according to the second embodiment.

FIG. 12 is a flowchart showing one example of the flow of a process executed by the plan controller 100A according to the second embodiment. The processes of Steps S300 to S308 shown in FIG. 12 are similar to the processes of Steps S100 to S108 shown in FIG. 5 described above, and thus description thereof will not be presented here.

In Step S310, the index deriver 110 determines whether or not the anxiety level derived in Step S308 is equal to or higher than a predetermined degree (Step S310).

In a case in which the anxiety level derived in Step S308 is not equal to or higher than the predetermined degree, processes of Steps S318 to S322 are executed. The processes of Steps S318 to S322 are similar to the processes of Steps S114 to S118 shown in FIG. 5, and thus description thereof will not be presented here.

On the other hand, in a case in which the anxiety level derived in Step S308 is equal to or higher than the predetermined degree, the monitor 114 determines whether or not the actual SOC is lower than the target SOC by a predetermined amount of power or more (Step S312). In a case in which the actual SOC is lower than the target SOC by the predetermined amount of power or more, the controller 112 operates the power generator (Step S314).

On the other hand, in a case in which the actual SOC is not lower than the target SOC by the predetermined amount of power or more, the output controller 116 causes the outputter to output information indicating that the actual SOC is within the range of the plan (Step S316). In this way, the process of one routine of this flowchart ends.

In accordance with the process described above, even in a case in which the anxiety level of the user is equal to or higher than a predetermined degree, in a case in which the actual SOC is not lower than the target SOC by a predetermined amount of power or more, the plan controller 100 does not operate the power generator but causes the outputter to output information indicating that the actual SOC is within the range of the plan, whereby the anxiety of the user can be alleviated while a useless operation of the power generator is curtailed.

Figure 13:
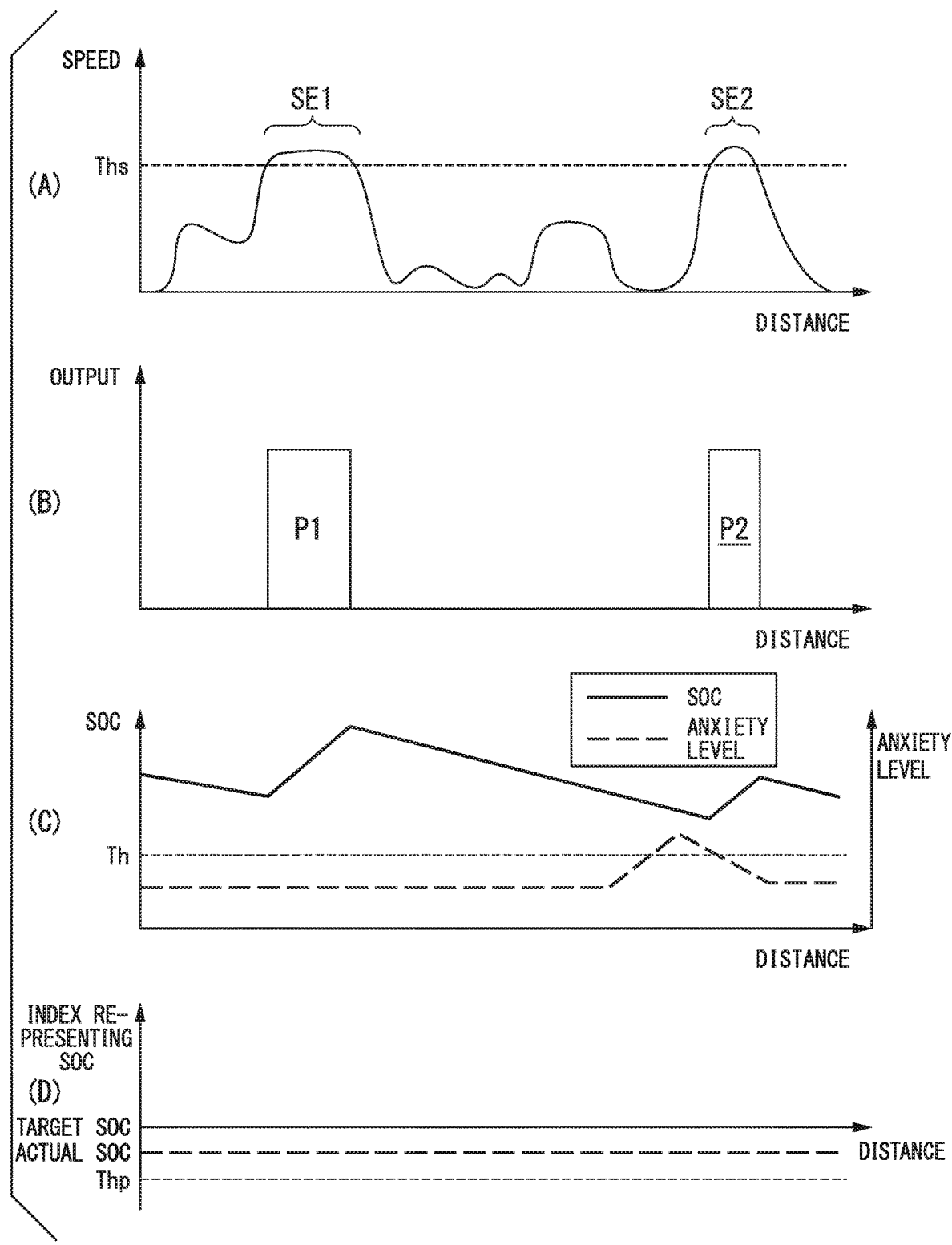
FIG. 13 is a diagram showing process results of the plan controller.

FIG. 13 is a diagram showing process results of the plan controller 100A. In FIG. 13, (A) is a diagram showing predicted transitions in the speed of a vehicle in a running plan. In FIG. 13, (B) is a diagram showing an operation plan of a power generator relating to the running plan shown in FIG. 13, (A). FIG. 13, (C) shows transitions in the SOC and transitions in the anxiety level of a vehicle occupant. In FIG. 13, (D) shows transitions in the actual SOC with respect to the target SOC. In FIG. 13, (A), (B), (C) and (D), the vertical axes respectively represent a vehicle speed, an output level of the power generator, an SOC or an anxiety level, and indexes representing a target SOC and an actual SOC, and, the horizontal axis represents a distance from a point of departure.

For example, in specific sections (SE1 and SE2 shown in FIG. 13, (A) in which the speed of the vehicle is equal to or higher than a speed threshold Ths, an operation plan operated by the power generator is generated. This operation plan is a plan in which a power associated with amounts of power P1 and P2 shown in FIG. 13, (B) is generated. For example, in a case in which the speed of the vehicle reaches a speed threshold Ths or more in a specific section on the basis of the operation plan, the controller 112 operates the power generator.

In accordance with the operation of the power generator described above and consumption of power in the second motor 18 and the like, as represented in FIG. 13, (C), the SOC transitions. In accordance with the transitions in the SOC, the anxiety level of the driver changes. For example, in a case in which the anxiety of the driver exceeds the threshold Th, the output controller 116, as shown in FIG. 13, (D), in a case in which it is determined by the monitor 114 that the actual SOC is not lower than the target SOC by a predetermined amount of power or more (in a case in which it is determined that the actual SOC is within the range of the threshold Thp to the target SOC), causes the outputter to output information indicating that the actual SOC is within the range of the plan. In this way, the user's anxiety can be alleviated while a useless operation of the power generator is curtailed.

On the other hand, for example, in a case in which the anxiety level of the driver exceeds the threshold Th, the controller 112, in a case in which it is determined by the monitor 114 that the actual SOC is lower than the target SOC by the predetermined amount of power or more (in a case in which it is determined that the actual SOC is outside of the range of the threshold Thp to the target SOC), operates the power generator. In this way, the user's anxiety can be alleviated. In other words, the power generator can be operated at a timing intended by the user.

In each of the embodiments described above, an example has been described in which the power generator is operated on the basis of the index based on the line of vision of the vehicle occupant regardless of the threshold of the amount of power of the battery 60. This index may be derived on the basis of another kind of information or may be derived with another kind of information taken into account as long as the information represents an anxiety level (or to the contrary, a relief level) of a vehicle occupant for the SOC. For example, the index may be derived by being increased in a case in which a vehicle occupant moves his or her body a little at a time (performs a predetermined action or behavior) or searches for a facility at which the battery 60 can be charged in the navigation device. When a process equivalent to that described above is performed, it may be directly determined whether or not the vehicle occupant is in an anxious state on the basis of a behavior of the vehicle occupant without deriving an index.

In such a case, the plan controller 100 (100A) includes a behavior determiner instead of (or in addition to) the line of vision determiner 108. The behavior determiner determines whether or not a vehicle occupant has performed a predetermined action or behavior from a result of analysis of an image captured by the vehicle interior camera 82 using a technique such as template matching or the like. The behavior determiner determines whether or not the vehicle occupant is searching for a facility at which the battery 60 can be charged on the basis of an operation performed for the navigation device.

According to the embodiment described above, by including the power generator including the engine 10 outputting power used by the first motor 12 and the first motor 12 generating power using the power output by the engine 10, the battery 60 storing power generated by the power generator, the second motor 18 connected to the driving wheels 25 of the vehicle and rotating the driving wheels 25 by being driven using power supplied from the power generator or the battery 60, the line of vision determiner 108 determining an area toward which the vehicle occupant has the line of vision directed, the index deriver 110 deriving an index based on a frequency at which the vehicle occupant has the line of vision directed toward a specific area on the basis of a determination result acquired by the line of vision determiner 108, and the controller 112 operating the power generator in a case in which an amount of power of the battery 60 is equal to or smaller than a threshold and operating the power generator regardless of the threshold of the amount of power of the battery 60 in a case in which the index derived by the index deriver 110 is equal to or higher than a predetermined degree, the power generator can be operated at a timing intended by the user.

[Hardware Configuration]

Figure 14:
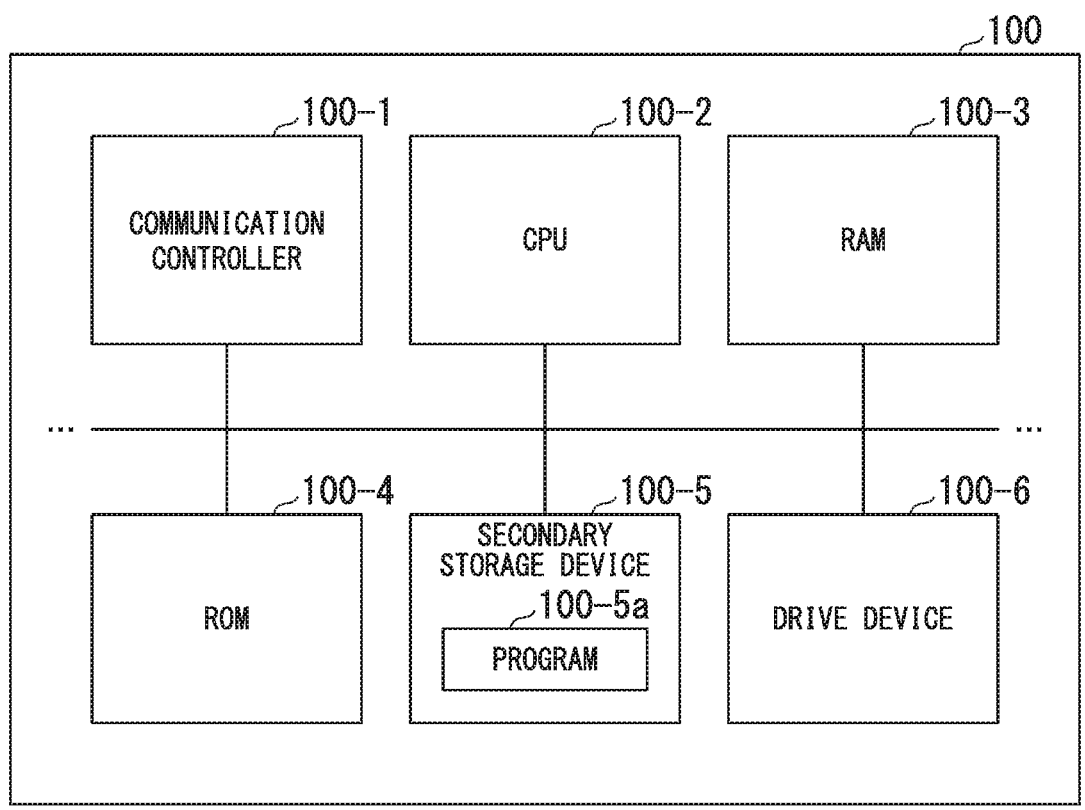
FIG. 14 is a diagram showing one example of the hardware configuration of a controller (plan controller) according to an embodiment.

The plan controller 100 (100A) of the vehicle system 1 according to the embodiment described above, for example, is implemented by a hardware configuration as shown in FIG. 14. FIG. 14 is a diagram showing one example of the hardware configuration of a controller (plan controller 100 or 100A) according to an embodiment.

The controller has a configuration in which a communication controller 100-1, a CPU 100-2, a RAM 100-3, a ROM 100-4, a secondary storage device 100-5 such as a flash memory or an HDD, and a drive device 100-6 are interconnected through an internal bus or a dedicated communication line. A portable storage medium such as an optical disc is loaded into the drive device 100-6. A program 100-5*a* stored in the secondary storage device 100-5 is expanded into the RAM 100-3 using a DMA controller (not shown in the drawing) or the like and is executed by the CPU 100-2, whereby the controller is implemented. The program referred to by the CPU 100-2 may be stored in a portable storage medium loaded into the drive device 100-6 or may be downloaded from another device through a network NW.

The embodiment described above can be expressed as below.

A vehicle control system includes: a power generator including an internal combustion engine is configured to output power and a power generator is configured to generate power using the power output by the internal combustion engine; a storage battery storing power generated by the power generator; a running electric motor connected to driving wheels of a vehicle and rotating the driving wheels by being driven using power supplied from the power generator or the storage battery; a storage device; and a hardware processor executing a program stored in the storage device, and determines an area toward which a vehicle occupant of the vehicle has a line of vision directed, derives an index based on a frequency at which the vehicle occupant has the line of vision directed toward a specific area on the basis of a result of the determination, and is configured to operate the power generator in a case in which an amount of power of the storage battery is equal to or smaller than a threshold and operates the power generator regardless of the threshold of the amount of power of the storage battery in a case in which the derived index is equal to or higher than a predetermined degree.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
a power generator configured to include an internal combustion engine is configured to output power used by an electric motor and an electric motor is configured to generate power using power output by the internal combustion engine;
a storage battery configured to store power generated by the power generator;
a running electric motor configured to be connected to driving wheels of a vehicle and rotate the driving wheels by being driven using power supplied from the power generator or the storage battery;
a determiner configured to determine an area toward which a vehicle occupant of the vehicle has a line of vision directed;
a deriver configured to derive an index based on a frequency at which the vehicle occupant has a line of vision directed toward a specific area on the basis of a determination result acquired by the determiner; and
a controller configured to operate the power generator in a case in which an amount of power of the storage battery is equal to or smaller than a threshold and operate the power generator regardless of the threshold of the amount of power of the storage battery in a case in which the index derived by the deriver is equal to or higher than a predetermined degree.

2. The vehicle control system according to claim 1, wherein the specific area is an area in which an indicator indicating an amount of power stored in the storage battery is disposed.

3. The vehicle control system according to claim 1, wherein the controller is configured to operate the power generator with a first output in a case in which the amount of power of the storage battery is equal to or smaller than the threshold and is configured to operate the power generator with the first output regardless of the threshold of the amount of power of the storage battery in a case in which the index derived by the deriver is equal to or higher than a predetermined degree, and the amount of power stored in the storage battery exceeds the threshold.

4. The vehicle control system according to any one of claim 1, wherein the controller is configured to operate the power generator with a second output in a case in which the index derived by the deriver is lower than the predetermined degree, and the amount of power of the storage battery is equal to or smaller than the threshold and is configured to operate the power generator with a third output larger than the second output regardless of the threshold of the amount of power of the storage battery in a case in which the index derived by the deriver is equal to or higher than the predetermined degree, and the amount of power stored in the storage battery is equal to or smaller than the threshold.

5. The vehicle control system according to any one of claim 1, further comprising:

a running planner configured to generate running plan information representing a running plan to a destination of the vehicle;

an operation planner configured to generate operation plan information that is an operation plan for operating the power generator on the basis of the running plan information generated by the running planner; and a monitor configured to monitor whether or not a current amount of power is lower than a target amount of power by a predetermined amount of power or more by comparing the current amount of power stored in the storage battery with the target amount of power of the storage battery associated with the operation plan information planned by the operation planner, wherein the controller is configured to operate the power generator on the basis of a monitoring result acquired by the monitor and the operation plan information planned by the operation planner.

6. The vehicle control system according to claim 5, wherein the controller temporarily cancels control of operating the power generator regardless of the threshold of the amount of power of the storage battery in a case in which the index derived by the deriver is equal to or higher than the predetermined degree, and it is determined by the monitor that the current amount of power is not smaller than the target amount of power by a predetermined amount of power or more.

7. The vehicle control system according to claim 5, further comprising an output controller configured to cause an outputter to output information indicating that the amount of power stored in the storage battery is within a range of a plan planned in advance in a case in which the index derived by the deriver is equal to or higher than the predetermined degree, and it is determined by the monitor that the current amount of power is not smaller than the target amount of power by a predetermined amount of power or more.

8. The vehicle control system according to any one of claim 1, wherein the index is an index representing an anxiety level of the vehicle occupant regarding the amount of power stored in the storage battery.

9. A vehicle control method using an in-vehicle computer of a vehicle that comprises: (a) a power generator configured to include an internal combustion engine is configured to output power used by an electric motor and an electric motor is configured to generate power using power output by the internal combustion engine; (b) a storage battery configured to store power generated by the power generator; and (c) a running electric motor configured to be connected to driving wheels of a vehicle and rotate the driving wheels by being driven using power supplied from the power generator or the storage battery, the method comprising:

determining an area toward which a vehicle occupant of the vehicle has a line of vision directed;

deriving an index based on a frequency at which the vehicle occupant has the line of vision directed toward a specific area on the basis of a result of the determination; and operating the power generator in a case in which an amount of power of the storage battery is equal to or smaller than a threshold and operating the power generator regardless of the threshold of the amount of power of the storage battery storing power generated by the power generator in a case in which the derived index is equal to or higher than a predetermined degree.

10. A non-transitory computer-readable storage medium that stores a computer program to be executed by a computer of a vehicle that comprises (a) a power generator configured to include an internal combustion engine is configured to output power used by an electric motor and an electric motor is configured to generate power using power output by the internal combustion engine; (b) a storage battery configured to store power generated by the power generator; and (c) a running electric motor configured to be connected to driving wheels of a vehicle and rotate the driving wheels by being driven using power supplied from the power generator or the storage battery, the medium to perform at least:

determine an area toward which a vehicle occupant of the vehicle has a line of vision directed;

derive an index based on a frequency at which the vehicle occupant has the line of vision directed toward a specific area on the basis of a result of the determination; and operate the power generator in a case in which an amount of power of the storage battery is equal to or smaller than a threshold and operating the power generator regardless of the threshold of the amount of power of the storage battery storing power generated by the power generator in a case in which the derived index is equal to or higher than a predetermined degree.

* * * * *